United States Patent [19]

Baron et al.

[11] 4,034,016
[45] July 5, 1977

[54] TERNARY POLYBLENDS PREPARED FROM POLYBUTYLENE TEREPHTHALATES, POLYURETHANES AND AROMATIC POLYCARBONATES

[75] Inventors: Arthur L. Baron, New Martinsville, W. Va.; John V. Bailey, Pittsburgh, Pa.

[73] Assignee: Mobay Chemical Corporation, Pittsburgh, Pa.

[22] Filed: July 15, 1976

[21] Appl. No.: 705,745

[52] U.S. Cl. .............................. 260/858; 260/860
[51] Int. Cl.² .................................. C08L 75/00
[58] Field of Search ............................. 260/858

[56] References Cited

UNITED STATES PATENTS

| 3,382,305 | 5/1968 | Breen | 260/858 |
| 3,431,224 | 5/1969 | Goldblum | 260/858 |
| 3,563,847 | 2/1971 | Rye | 260/858 |
| 3,713,821 | 1/1973 | Angelini | 260/858 |
| 3,904,706 | 9/1975 | Hoeschele | 260/858 |
| 3,951,910 | 4/1976 | Mark | 260/858 |

FOREIGN PATENTS OR APPLICATIONS

| 610,140 | 10/1948 | United Kingdom | 260/858 |

*Primary Examiner*—Paul Lieberman
*Attorney, Agent, or Firm*—Gene Harsh; Lawrence S. Pope; Frederick H. Colen

[57] ABSTRACT

Ternary polyblends consisting essentially of polybutylene terephthalates, polyurethanes, and aromatic polycarbonates in proportions within carefully delineated ranges exhibit solvent stress cracking resistance and a toughness not to be found in any one or blended two of the foregoing components.

23 Claims, No Drawings

TERNARY POLYBLENDS PREPARED FROM POLYBUTYLENE TEREPHTHALATES, POLYURETHANES AND AROMATIC POLYCARBONATES

BACKGROUND OF THE INVENTION

1. Field of the Invention

This invention relates to ternary polymer blends consisting of aromatic polycarbonates, polyurethanes, and polybutylene terephthalates.

2. Description of the Prior Art

Aromatic polycarbonates, as well as other constituents of the ternary polyblend, are well known and in addition possess on the whole excellent characteristics for injection molding and for other uses as a plastic. Correction of deficiencies of the polycarbonates especially for particular uses has been sought by copolymerization, cf. German Pat. No. 1,011,148 and Belgian Pat. No. 546,375 and 570,531, and especially McPherson et al., U.S. Pat. No. 3,187,065, in which a mixed polycarbonate-polyurethane polymer is disclosed and claimed; blending with other polymeric additives, Goldblum, U.S. Pat. No. 3,431,224; and the addition of other compounds and stabilizers, Calkino, U.s. Pat. No. 3,498,946 and Bialous, U.S. Pat. No. 3,742,083. Improvements in the qualities of polyurethane elastomers, which also exhibit excellent individual characteristics are accomplished by such processes as the polyester based condensation of Muller et al., U.S. Pat. No. 2,729,618, and the preparation of polyether or mixed polyether and polyester based elastomers such, for example, as are disclosed and claimed in Pigott et al., U.S. Pat. No. 3,012,992. The commercially available polybutylene terephthalate can be prepared by the method of Izard et al., U.S. Pat. No. 2,597,643, by esterfying terephthalic acid with a glycol, and also displays many excellent characteristics. However, it is not so ideal for some situations and may, therefore, need to be modified by the use of fillers such as glass fibers.

It is an object of this invention to provide thermoplastic and thermoelastic polyblends of commercially available polymers having improved resistance to environmental stress cracking caused by poor solvent resistance and improved impact strength, hitherto unavailable without corresponding impairment of other acceptable characteristics of the polymers.

Another object of the invention is the provision of a ternary blend of commercially available polymers that has a high critical thickness value (i.e. avoids decreases in impact strength with increasing specimen thickness), or as otherwise expressed to provide the advantages of blends while avoiding the apparently inescapable disadvantage of blends, as with polycarbonates, of lowering the critical thickness value.

SUMMARY OF THE INVENTION

These objects are attained by providing a polyblend consisting essentially of from about 10 to 40 parts by weight of an aromatic polycarbonate, about 35 to 60 parts by weight of polybutylene terephthalate, and about 20 to 40 parts by weight of a polyether or polyester based polyurethane wherein more than about 20 parts by weight of polyurethane are used if more than about 55 parts by weight of polybutylene terephthalate are used. The polyblends of this invention substantially overcome or greatly diminish environmental stress cracking and (critical thickness derived) decreases in impact strength of for example the otherwise excellent aromatic polycarbonates. The blends that were prepared by means of polyblending the three polymers did indeed exhibit critical thickness (> 250 mils) greater than the ability of available equipment to measure. The blends are white in appearance, high in surface gloss, and easy to process. They are all characterized by outstanding impact properties as evidenced by their high ⅛ and ¼ notched Izod impact values (ASTM D-256), as will be hereinafter set forth.

The aforesaid range of parts by weight of each essential component of the blend are critical to attainment of the toughness hereinabove described. Further improvement will, however, be provided within a preferred range of about 20 to 35 parts by weight of aromatic polycarbonate, about 45 to 55 parts by weight of a polybutylene terephthalate, and about 20 to 30 parts by weight of polyurethane. Optimum results were observed for the specific aromatic polycarbonate, polybutylene terephthalate and polyurethane used in the ternary blend of the invention when between about 20 and 30 parts by weight, between about 47 and 52 parts by weight and between about 20 and 25 parts by weight, respectively, were employed.

DETAILED DESCRIPTION OF THE INVENTION

The aromatic polycarbonates useful in the ternary polyblend can be most basically defined as possessing the repetitive carbonate group

and in addition will always have the

radical attached to the carbonate group (cf. Bolgiano, U.S. Pat. No. 3,070,563).

Preferably, the aromatic polycarbonate can be characterized as possessing recurring structural units of the formula

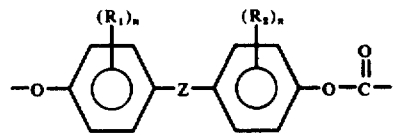

wherein Z is a single bond, an alkylene or alkylidene radical with 1–7 carbon atoms, a cycloalkylene or cycloalkylidene radical with 5 to 12 carbon atoms, $-O-$, $-S-$, $-CO-$, $-SO-$, or $-SO_2-$, preferably methylene or isopropylidene; $R_1$ and $R_2$ are hydrogen, halogen or an alkylene or alkylidene radical having 1–7 carbon atoms; and $n$ equals 0 to 4.

Most preferably, the aromatic polycarbonates useful in the practice of the invention have a melt flow rate range of about 1 to 24 gms/10 min. at 300° C as measured by ASTM D-1238.

The most important aromatic polycarbonate on the basis of commercial availability and available technical information is the polycarbonate of bis(4-hydroxyphenyl)-2,2-propane, known as bisphenol-A polycarbonate; commercially available, for example, in four grades from Mobay Chemical Corporation as Merlon M-39 (melt flow of about 12-24), M40 (melt flow of about 6-12), M50 (melt flow of about 3-6) and M60 (melt flow < 3).

The polybutylene terephthalate employed in the ternary polyblend is composed of recurring structural units of the formula

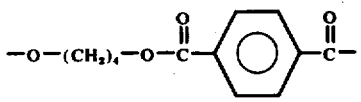

and can be produced by the process taught in U.S. Pat. No. 2,465,319 to Winfield et al. It may be prepared by heating together terephthalic acid and an excess of tetramethylene glycol at a temperature between 220 and 240° C and thereafter heating the reaction mixture in the absence of air and presence of nitrogen or other inert gas for some hours until a desired intrinsic viscosity is reached. The resin can then be heated under vacuum to remove by-products. For the purposes of the present invention the polybutylene terephthalic polyester should have an intrinsic viscosity of at least about 0.95 and preferably between 1.20 and 1.30. As is well known, intrinsic viscosity is determined as an indication of the more difficultly measurable molecular weight of condensation polymers and is defined as:

Limit $nsp./C$ as $C$ approaches zero where $nsp$ is the viscosity of a dilute orthochlorophenol solution of the polyester divided by the viscosity of the orthochlorophenol solvent per se measured in the same units at the same temperature, and $C$ is the concentration in grams of the polyester per 100 cc of solution, as is set forth in the specification, column 3 of U.S. Pat., Izard et al. No. 2,597,643.

The polybutylene terephthalate employed in the ternary blend is commercially available as Eastman 6 PRO having an intrinsic viscosity of about 1.22 and as VITUF 4884 of the Goodyear Tire and Rubber Company having an intrinsic viscosity of about 1.25 cf., their bulletin entitled "Polyester-VITUF Polyesters for Injection Molding."

Suitable thermoplastic polyurethanes useful in the invention are those prepared from a diisocyanate, a polyester or polyether and a chain extender. These thermoplastic polyurethanes are those which are substantially linear and maintain thermoplastic processing characteristcs.

These thermoplastic polyurethanes may be synthesized by methods disclosed in U.S. Pat. No. 3,214,411 incorporated herein by reference. A particularly useful polyester resin used as a starting material for the thermoplastic polyurethane are those produced from adipic acid and a glycol having at least one primary hydroxyl group. The adipic acid is condensed with a suitable glycol or mixture of glycols which have at least one primary hydroxyl group. The condensation is stopped when an acid number of from about 0.5 to about 2.0 is reached. The water formed during the reaction is removed simultaneously therewith or subsequently thereto such that the final water content is from about 0.01 to about 0.02% preferably from about 0.01 to 0.05%.

Any suitable glycol may be used in reaction with the adipic acid such, as, for example, ethylene glycol, propylene glycol, butylene glycol, hexanediol, bis- (hydroxymethylcyclohexane), 1,4-butanediol, diethylene glycol, 2,2-dimethyl propylene glycol, 1,3-propylene glycol and the like. In addition to the glycols, a small amount of trihydric alcohol up to about 1% may be used along with the glycols such as, for example, trimethylolpropane, glycerine, hexanetriol and the like. The resulting hydroxyl polyester has a molecular weight of at least about 600, a hydroxyl number of about 25 to about 190 and preferably between about 40 and about 60, and acid number of between about 0.5 and about 2 and a water content of 0.01 to about 0.2%.

The organic diisocyanate to be used in the preparation of the elastomer is preferably 4,4'-diphenylmethane diisocyanate. It is desired that the 4,4'-diphenylmethane diisocyanate contain less than 5% of 2,4'-diphenylmethane diisocyanate and less than 2% of the dimer of diphenylmenthane diisocyanate. It is further desired that the acidity calculated as HCl is from about 0.0001 to about 0.02%. The acidity calculated as percent HCl is determined by extracting the chloride from the isocyanate in a hot aqueous methanol solution or by liberating the chloride on hydrolysis with water and titrating the extract with a standard silver nitrate solution to obtain the chloride ion concentration present.

Other diisocyanates may be used in preparing the thermoplastic processable polyurethanes such as ethylene diisocyanate, ethylidene diisocyanate, propylene diisocyanate, butylene diisocyanate, cyclopentylene-1,3-diisocyanate, cyclohexylene-1,4-diisocyanate, cyclohexylene-1,2-diisocyanate, 2,4-tolylene diisocyanate, 2,6-tolylene diisocyanate, 2,2-diphenylpropane-4,4'-diisocyanate, p-phenylene diisocyanate, m-phenylene diisocyanate, xylylene diisocyanate, 1,4-naphthylene diisocyanate, 1,5-napthylene diisocyanate, diphenyl-4,4'-diisocyanate, azobenzene-4,4'-diisocyanate, diphenyl sulfone-4,4'-diisocyanate, dichlorohexamethylene diisocyanate, tetramethylene diisocyanate, pentamethylene diisocyanate, hexamethylene diisocyanate, 1-chlorobenzene-2,4-diisocyabate, furfurylidene diisocyanate and the like.

Any suitable chain extending agent having active hydrogen containing groups reactive with isocyanate groups may be used such as, for example, diols including ethylene glycol, propylene glycol, butylene glycol, 1,4-butanediol, butenediol, butynediol, xylylene glycols, amylene glycols, 1,4-phenylene-phenylene-bis-β-hydroxy ethyl ether, 1,3-phenylene-bis-β-hydroxy ethyl ether, bis-(hydroxy-methyl-cyclohexane), hexanediol, thiodiglycol and the like; diamines including ethylene diamine, propylene diamine, butylene diamine, hexamethylene diamine, cyclohexalene diamine, phenylene diamine, tolylene diamine, xylylene diamine, 3,3'-dichlorobenzindine, 3,3'-dinitrobenzidine and the like; alkanol amines such as, for example, ethanol amine, aminopropyl alcohol, 2,2-dimethyl propanol amine, 3-aminocyclohexyl alcohol, p-aminobenzyl alcohol and the like. The difunctional chain extenders mentioned in U.S. Pat. No. 2,620,516, 2,621,166 and 2,729,618 incorporated herein by reference may be used. If desirable, a small amount of polyfunctional material may be utilized. This polyfunctional chain extender, however, should not be present in an amount greater than about 1% by weight. Any suitable polyfunctional compound may be used in this application such as, for example, glycerine, trimethylolpropane, hexanetriol, pentaerythritol and the like.

In accordance with the process of this invention, the polyester, the organic diisocyanate and the chain extender may be individually heated preferably to a temperature of from about 60°. To about 135° C. and then the polyester and chain extender are substantially simultaneously mixed with the diisocyanate. In a preferred embodiment, the chain extender and the polyester each of which has been previously heated, are first mixed and the resulting mixture is mixed with heated diisocyanate. This method is preferred for the reason that the extender and the polyester will not react prior to the introduction of the diisocyanate and rapid mixing with the diisocyanate is thus facilitated. The mixing of the polyester, the chain extender and diisocyanate may be suitably carried out by using any mechanical mixer such as one equipped with a stirrer which results in intimate mixing of the three ingredients in a short period of time. If the material begins to become too thick, either the temperature may be lowered or a small amount of citric acid or the like of from about 0.001 to about 0.050 part by weight based on 100 parts of the polyester may be added to slow down the reaction. Of course, to increase the rate of reaction, any suitable catalyst may be added to the reaction mixture such as tertiary amines and the like as set forth in U.S. Pat. Nos. 2,620,516, 2,621,166 and 2,729,618. The reaction mixture, after complete mixing, is conducted onto a suitable heated surface or poured onto a table or conveyor preferably maintained at a temperature of from about 60° C. until it solidifies, e.g., into a slab so that it is still a thermoplastic and can be easily removed and reduced to the desired particle size. To facilitate the ready removal of the material from the hot plate, the table, conveyor or other surface, the slab or other physical form may be cut or scored while it is still soft to permit removal in a number of pieces rather than as a unit. This cutting or scoring is best done while the reaction mixture is still soft, for when the material hardens it becomes difficult to cut although it can still be readily reduced in size by grinders, choppers and other equipment known in the industry.

After the reaction mixture has partially reacted to form a hard product which is suitable for cutting, chopping or grinding, it is cooled to room temperature. This material may then be either stored for several weeks, if desired, or it may be immediately further processed after blending with the polybutylene terephthalate and aromatic polycarbonate by extrusion, compression molding, injection molding or other similar techniques known in the industry.

Although adipate polyesters are preferred, polyesters may be used which are based on succinic acid, suberic acid, sebacic acid, oxalic acid, methyl adipic acid, glutaric acid, pimelic acid, axelaic acid, phthalic acid, terephthalic acid, isophthalic acid and the like.

A polyether may be used instead of the polyester in the preparation of the thermoplastic polyurethane and preferably polytetramethylene glycol having an average molecular weight between about 600 and 2000 and preferably about 1000. Other polyethers such as polypropylene glycol, polyethylene glycol and the like may be used providing their molecular weight is above about 600.

The above and other thermoplastic polyurethanes such as disclosed in U.S. Pat. Nos. 2,621,166, 2,729,618, 3,214,411, 2,778,810, 3,012,992 Canadian Pat. Nos. 754,233, 733,577 and 842,325 all incorporated herein by reference may be used to produce thermoplastic polyurethanes for blending with the polybutylene terephthalates and the aromatic polycarbonates.

Among the thermoplastic polyurethane elastomers commercially available for use in the polyblend of this invention are the Texin elastoplastics of Mobay Chemical Corporation. The thermoplastic polyurethanes useful in the ternary polyblend characteristically contain the urethane structure represented by the following formula:

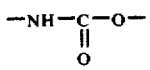

Most preferably, the polyurethanes useful in the present invention have Shore hardnesses (ASTM D2240) between about 70 on the A scale and 60 on the D scale.

Physical properties of various grades of polyurethanes are found in Saunders and Frisch, *Polyurethanes, Chemistry and Technology*, Interscience Publishers, Part II Technology, p. 383, Table XLVI; and in *An Engineering Handbood of TEXIN Urethane Elastoplastic Materials*, Mobay Chemical Corporation, Pittsburgh, Pa.

In the following specific examples, and in Table 1, thereafter appearing and containing additional product data, formulations of the ternary blend falling within the invention are shown to possess improved stress crack resistance and toughness and in every case a critical thichness (in mils) in excess of 250.

EXAMPLE 1

A blend composition was prepared containing 50 percent by weight of a polybutylene terephthalate having an intrinsic viscosity of about 1.22 which was first tray-dried for 24 hours at 110° C; 25 percent by weight of a bisphenol-A polycarbonate having a melt flow rate range of about 6–12 gms/10 min. at 300° C (ASTM D 1238) which was tray-dried overnight at 110° C; and 25 percent of an elastoplastic polyurethane having a Shore hardness of about A91 ± 3 (ASTM D 2240) which was tray-dried for 3 hours at 110° C. The components, in the form of pellets, were blended for 5 minutes in a 30 gallon stainless drum thereafter melted. The melt was extruded in a 1½ inch Waldron-Hartig extruder, the compression screw of which contains mixing knobs. The temperature profile of extrusion was:

| Rear Zone | Middle Zone | Front Zone | Die | RPMS | Mill Temp. | Screens |
|---|---|---|---|---|---|---|
| 480° F | 500° F | 460° F | 460° F | 40 | 465° F | 40–60–20 |

The extruded strands were pelletized and samples were molded for the evaluation of physical properties. The notched Izod impact strength at ⅛ inch was 25.4 foot pounds per inch and at ¼ inch was 15.4 foot pounds per inch. The critical thickness of the molded product of this blend composition was greater than 250 mils. additional data reporting the heat distortion temperature, flexural and tensile strength, and hardness are reported in the following Table 1.

EXAMPLE 2

A ternary blend was prepared by the method of Example 1 in which blend the components were present as 50 percent by weight of polybutylene terephthalate having an intrinsic viscosity of about 1.22, 30 percent by weight of bisphenol-A polycarbonate having a melt flow rate range of about 6–12 gms/10 min. at 300° C and 20 percent by weight of an elastoplastic polyester-based polyurethane having a Shore hardness of about A91 ± 3. Molded samples of the blend exhibited a notched impact strength of 21.9 foot pounds per inch at ⅛ inch and 3.7 foot pounds per inch at ¼ inch. The critical thickness of the molded product of this blend composition was greater than 250 mils. Additional data respecting this specific example are contained in the following Table 1.

EXAMPLE 3

A ternary blend was prepared by the method of Example 1 in which blend the components were present as 35 weight percent of polybutylene terephthalate having an intrinsic viscosity of about 1.22, 40 weight percent of bisphenol-A polycarbonate having a melt flow rate range of about 6–12 gms/10 min. at 300° C and 25 weight percent of an elastoplastic polyester-based polyurethane having a Shore hardness of about A91 ± 3. Molded samples of the extruded blend showed a notched Izod impact strength of 18.6 foot pounds per inch at ⅛ inch and 15.7 foot pounds per inch at ¼ inch, the former value being substantially less than the ⅛ inch notched Izod impact strength for blends containing a preferred amount of 45 to 55 parts of the polybutylene terephthalate. The critical thickness of the molded product of this blend composition was greater than 250 mils. Additional data respecting this specific example are contained in the following Table 1. Inspection of the data will show that while all components are within a range of percent by weight providing the advantageous product of the invention, use of less than 45 percent by weight of the polybutylene terephthalate and more than 30 percent by weight of the polycarbonate, while not impairing the critical thickness or other parameters (cf. Table 1) of the product of the invention, gives less than the most preferred result.

EXAMPLE 4

A ternary blend was prepared by the method of Example 1. In the case of this Example 4 the blended components were mixed in the proportions of 35 weight percent of polybutylene terephthalate having an intrinsic viscosity of about 1.22, 25 weight percent of bisphenol-A polycarbonate having a melt flow rate range of about 6–12 gms/10 min. at 300° C, and 40 weight percent of an elastoplastic polyesterbased polyurethane having a Shore hardness of about A91 ± 3. Molded samples of the extruded blend showed a notched Izod impact strength of 21.7 foot pounds per inch at ⅛ inch and 15.8 foot pounds per inch at ¼ inch. The critical thickness of the molded product of this blend composition was greater than 250 mils. Additional data respecting this composition are also to be found in the following Table 1.

EXAMPLE 5

In this Example a polyblend prepared by the method of Example 1 contained 50 weight percent of polybutylene terephthalate having an intrinsic viscosity of about 1.22, 20 weight percent of bisphenol-A polycarbonate having a melt flow rate range of 6–12 gms/10 min. at 300° C and 30 weight percent of an elastoplastic polyester-based polyurethane having a Shore hardness of about A91 ± 3. The critical thickness of a molded product of this composition also was greater than 250 mils and the notched Izod impact strength at ⅛ inch was 24.8 foot pounds per inch, the highest exhibited by any combination of components of the blend, and at ¼ inch, 15.7 foot pounds per inch. Other physical characteristics of this polyblend are to be found in Table 1.

EXAMPLE 6

A ternary blend was prepared by the method of Example 1. In this Example the blended components were mixed in the proportions of 50 weight percent of polybutylene terephthalate having an intrinsic viscosity of about 1.22, 10 weight percent bisphenol-A polycarbonate having a melt flow rate range of about 6–12 gms/10 min. at 300° C and 40 weight percent of an elastoplastic polyester-based polyurethane having a Shore hardness of about A91 ± 3. Molded samples of the extruded blend showed a notched Izod impact strength of 26.4 foot pounds per inch at ⅛ inch and 15.8 foot pounds per inch at ¼ inch. The critical thickness of the molded product of this blend composition was greater than 250 mils. Additional data respecting this composition are to be found in Table 1.

EXAMPLE 7

In this Example a polyblend prepared by the method of Example 1 contained 60 weight percent of polybutylene terephthalate having a intrinsic viscosity of about 1.22. 10 weight percent of bisphenol-A polycarbonate having a melt flow rate range of about 6–12 gms/10 min. at 300° C and 30 weight percent of an elastoplastic polyester-based polyurethane having a Shore hardness of about A91 ± 3. The critical thickness of a molded product of this composition was also greater than 250 mils, and the notched Izod impact strength at ⅛ inch was 26.4 foot pounds per inch and was 15.8 foot pounds at ¼ inch. Other properties of this polyblend are to be found in Table 1.

EXAMPLE 8

In this Example a polyblend prepared by the method of Example 1 contained 50 weight percent of polybutylene terephthalate having an intrinsic viscosity of about 1.22, 25 weight percent of bisphenol-A polycarbonate having a melt flow rate range of about 6–12 gms/10 min. at 300° C and 25 weight percent of an elastoplastic polyether-based polyurethane having a Shore hardness of about D48 ± 2. The critical thickness of a molded product of this composition was greater than 250 mils, and the notched Izod impact strength at ⅛ inch and ¼ inch was 24.8 foot pounds per inch and 16.0 foot pounds per inch, respectively. Additional data respecting the properties of this composition is also found in the following Table 1.

TABLE 1

PHYSICAL PROPERTIES OF VARIOUS TERNARY POLYBLENDS OF POLYBUTYLENE TEREPHTHALATE (PBT), BISPHENOL-A POLYCARBONATE (PC) AND POLYURETHANE (PU)

| Sp. Ex. | Blend Composition | Notched Izod (ft. lb./in.) | Critical Thickness (mils) | Heat Distortion °C at 264 psi | Flexural Modulus psi × 10⁵ | Ultimate Flexural Strength (psi) | Tensile Strength at Break (psi) | Tensile Elongation at Break (%) | Rockwell Hardness (M) |
|---|---|---|---|---|---|---|---|---|---|
| 1 | 50% PBT 25% PC 25% PU | 25.4 (⅛") 15.4 (¼") | >250 | 57 | 3.73 | 11,200 | 5,800 | 200 | 41 |
| 2* | 50% PBT 30% PC 20% PU | 21.9 (⅛") 3.7 (¼") | >250 | 66 | 2.66 | 10,000 | 5,900 | 161 | 49 |
| 3 | 35% PBT 40% PC 25% PU | 18.6 (⅛") 15.7 (¼") | >250 | 76 | 2.66 | 9,500 | 6,400 | 133 | 40 |
| 4 | 35% PBT 25% PC 40% PU | 21.7 (⅛") 15.8 (¼") | >250 | 54 | 1.64 | 6,300 | 6,200 | 188 | 30 |
| 5 | 50% PBT 20% PC 30% PU | 24.8 (⅛") 15.7 (¼") | >250 | 56 | 2.05 | 7,700 | 5,300 | 144 | 36 |
| 6 | 50% PBT 10% PC 40% PU | 26.4 (⅛") 15.8 (¼") | >250 | 53 | 1.54 | 5,800 | 4,900 | 185 | 26 |
| 7 | 60% PBT 10% PC 30% PU | 26.4 (⅛") 15.8 (¼") | >250 | 53 | 2.05 | 7,400 | 4,400 | 230 | 34 |
| 8 | 50% PBT 25% PC 25% PU** | 24.8 (⅛") 16.0 (¼") | >250 | 68 | 2.35 | 8,600 | 5,900 | 170 | 40 |

**(Polyether based)

*An apparent inconsistency appeared to exist between the ¼" notched Izod impact value of 3.7 foot pounds per inch and the critical thickness value of greater than 250 mils. Accordingly, the ¼" Izod impact value and the critical thickness value of this blend were rerun. The following data resulted:

| ⅛ inch notched Izod impact (gate end) (ft. lb/in) | ¼ inch notched Izod impact (dead end) (ft. lb/in) | Critical thickness (mils) |
|---|---|---|
| 15.45, 13.24, 4.75 } 11.05 average | 14.31, 12.87, 10.48 } 12.5 average | >250 |

From an analysis of the above data, it appears as if this blend may be very close to the borderline of ductile to brittle breaks on parts of 250 mils thickness. Critical thickness values were established on a limited number of samples, and if many samples were tested, it is believed that both brittle and ductile breaks would probably be obtained at a 250 mils thickness.

EXAMPLE 9

For purposes of comparison with the foregoing blends a product consisting solely of polybutylene terephthalate resin having an intrinsic viscosity of about 1.22 was molded and tested. The molded product showed a notched Izod impact strength of only 0.8 foot pounds per inch at ⅛ inch and 0.9 foot pounds per inch at ¼ inch. The critical thickness of the molded polybutylene terephthalate was less than 100. Other physical criteria will be found in Table 2.

EXAMPLE 10

For the purpose of comparison with the foregoing blends, a product consisting solely of bisphenol-A polycarbonate having a melt flow rate range of about 6–12 gms/10 min. at 300° C (ASTM D-1238) was prepared and tested. The molded product had a notched Izod at ⅛ inch of 16.6 foot pounds per inch and at ¼ inch of 2.4 foot pounds per inch. The molded polycarbonate had a critical thickness of 170 mils. Other criteria are to be found in Table 2.

Table 2

PHYSICAL PROPERTIES OF PURE POLYBUTYLENE TEREPHTHALATE (PBT) AND PURE BISPHENOL-A POLYCARBONATE (PC)

| Sp. Ex. | Blend Composition | Notched Izod (ft. lb./in.) | Critical Thickness (mils) | Distortion °C at 264 psi | Flexural Modulus psi × 10⁵ | Ultimate Flexural Strength (psi) | Tensile Strength at Break (psi) | Tensile Elongation at Break (%) | Rockwell Hardness (M) |
|---|---|---|---|---|---|---|---|---|---|
| 9 | | 0.8 (⅛") 0.9 (¼") | <100 | 52 | 3.48 | 12,300 | 4,900 | 165 | 79 |
| 10 | | 16.6 (⅛") 2.4 (¼") | 170 | 132 | 3.58 | 13,800 | 10,000 | 109 | 64 |

EXAMPLES 11 – 14

A series of blends (Examples 11, 12, 13 and 14) prepared according to the method described in Example 1 were prepared in which the weight percent of at least one component was outside the prescribed range of this invention. The physical properties of these blends are set forth in the following Table 3. The simplest indicia to be observed in these data are the critical thickness values, all below 200.

Table 3

| Sp. Ex. | Blend Composition | Notched Izod (ft. lb./in.) | Critical Thickness (mils) | Heat Distortion °C at 264 psi | Flexural Modulus psi × 10⁵ | Ultimate Flexural Strength (psi) | Tensile Strength at Break (psi) | Tensile Elongation at Break (%) | Rockwell Hardness (M) |
|---|---|---|---|---|---|---|---|---|---|
| | | COMPARISON OF TERNARY BLENDS FALLING OUTSIDE THE PRESCRIBED RANGE OF INVENTION | | | | | | | |
| 11 | 65% PBT 25% PC 10% PU | 2.2 (⅛") 1.3 (¼") | 132 | 58 | 4.12 | 8,200 | 5,700 | 125 | 69 |
| 12 | 50% PBT 40% PC 10% PU | 2.5 (⅛") 1.6 (¼") | 112 | 80 | 3.17 | 12,100 | 7,600 | 153 | 68 |
| 13 | 60% PBT 20% PC 20% PU | 24.8 (⅛") 3.1 (¼") | 147 | 54 | 2.61 | 9,400 | 6,400 | 196 | 47 |
| 14 | 65% PBT 15% PC 20% PU | 23.7 (⅛") 3.6 (¼") | 167 | 55 | 2.56 | 8,900 | 4,400 | 210 | 45 |

EXAMPLE 15

Polyblends were prepared in accordance with the method described in Example 1 and contained in one instance the proportions of each component that were employed in Example 1 and in another instance the proportions that were employed in Example 2. The solvent stress crack resistance of these polyblends was determined by flexing specimens of the polyblends in an aluminum jig and immersing in a solvent, and was compared with that of a bisphenol-A polycarbonate in gasoline, toluene, carbon tetrachloride, and acetone. As can be seen in the following Table 4, the results are dramatic and reflect more than could be expected merely from blending the other components with the polycarbonate.

Table 4

ROOM TEMPERATURE RESISTANCE TO ENVIRONMENTAL SOLVENT STRESS CRACKING OF BISPHENOL A POLYCARBONATE (PC) VERSUS TERNARY BLENDS

| | Time to Failure (minutes) | | | |
|---|---|---|---|---|
| 100% PC (control) | Gasoline 86 | Toluene 120 | Carbon Tetrachloride 1 second | Acetone 1 second |
| 50% PBT 25% PC 25% PU | No stress cracking after 24 hours ⟶ | | | |
| 50% PBT 30% PC 20% PU | No stress cracking after 24 hours ⟶ | | | |

The ternary polyblend of this invention, in which all three resin components are surprisingly compatible as evidenced by the improved strength of the polyblend, finds many uses based upon its high impact and excellent solvent resistance, for example, as motorcycle helmets. Other uses are to be found in the areas of housings for business machines, electrical equipment, and tools.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A ternary polyblend consisting essentially of an intimate mixture of between about 10 and 40 parts by weight of an aromatic polycarbonate possessing the repetitive carbonate group

and having the

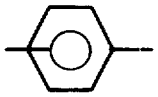

radical attached to the carbonate group; from about 35 to 60 parts by weight of polybutylene terephthalate composed of recurring structural units of the formula

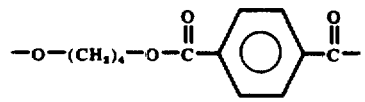

and from about 20 to 40 parts by weight of a polyurethane that is a reaction product of a diisocyanate, a polyester or polyether and a chain extender characteristically containing the urethane structure

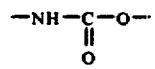

wherein more than about 20 parts by weight of polyurethane are used if more than about 55 parts of polybutylene terephthalate are used.

2. A ternary polyblend composition consisting essentially of a melt-extruded intimate mixture of between about 10 and 40 parts by weight of an aromatic polycarbonate possessing recurring structural units of the formula

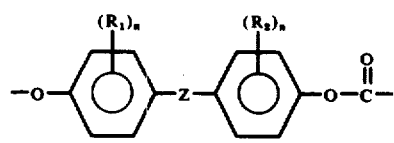

wherein $3$ is a single bond, an alkylene or alkylidene radical with 1–7 carbon atoms, a cycloalkylene or cycloalkylidene radical with 5–12 carbon atoms, —O—, —S—, —CO—, —SO— or —SO$_2$—; R$_1$ and R$_2$ are hydrogen, halogen or an alkylene or alkylidene radical having 1–7 carbon atoms; and $n$ equals 0 to 4; from about 35 to 60 parts by weight of polybutylene terephthalate composed of recurring structural units of the formula

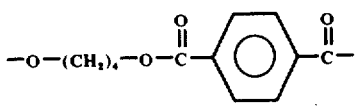

and from about 20 to 40 parts by weight of a polyurethane resin characteristically containing the urethane structure

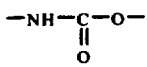

and selected from the group consisting of polyester and polyether based polyurethanes wherein more than about 20 parts by weight of polyurethane are used if more than about 55 parts by weight of polybutylene terephthalate are used.

3. A ternary polyblend composition consisting essentially of a melt-extruded intimate mixture of between about 10 and 40 parts by weight of a bisphenol-A polycarbonate; from about 35 to 60 parts by weight of a polybutylene terephthalate resin; and from about 20 to 40 parts by weight of a polyurethane resin characteristically containing the urethane structure

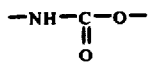

and selected from the group consisting of polyester and polyether based polyurethanes wherein more than about 20 parts by weight of polyurethane are used if more than about 55 parts by weight of polybutylene terephthalate are used.

4. The composition of claim 1 wherein the polybutylene terephthalate is present in from about 45 to 55 parts by weight.

5. The composition of claim 4 wherein the polybutylene terephthalate is present in from about 47 to 52 parts by weight.

6. The composition of claim wherein the aromatic polycarbonate is present in from about 20 to 35 by weight.

7. The composition of claim 6 wherein the aromatic polycarbonate is present in from about 20 to 30 by weight.

8. The composition of claim 7 in which the aromatic polycarbonate is a bisphenol-A polycarbonate.

9. The composition of claim 1 wherein the polyurethane is present in from about 20 to 30 parts by weight.

10. The composition of claim 9 wherein the polyurethane is present from about 20 to 25 parts by weight.

11. The composition of claim 1 wherein the aromatic polycarbonate has a melt flow rate range of about 1 to 24 gms/ 10 min. (ASTM D-1238).

12. The composition of claim 1 wherein the polybutylene terephthalate has an intrinsic viscosity of at least about 0.95.

13. The composition of claim 1 wherein the polyurethane has a Shore hardness of between about 70 on the A scale and 60 on the D scale (ASTM D-2240).

14. The composition of claim 2 wherein the polybutylene terephthalate is present in from about 45 to 55 parts by weight.

15. The composition of claim 14 wherein the polybutylene terephthalate is present in from about 47 to 52 parts by weight.

16. The composition of claim 2 wherein the aromatic polycarbonate is present in from about 20 to 35 by weight.

17. The composition of claim 16 wherein the aromatic polycarbonate is present in from about 20 to 30 parts by weight.

18. The composition of claim 17 in which the polycarbonate is a bisphenol-A polycarbonate.

19. The composition of claim 2 wherein the polyurethane is present from about 20 to 30 parts by weight.

20. The composition of claim 19 wherein the polyurethane is present from about 20 to 25 parts by weight.

21. The composition of claim 2 wherein the aromatic polycarbonate has a melt flow rate range of about 1 to 24 gms/ 10 min. (ASTM D-1238).

22. The composition of claim 2 wherein the polybutylene terephthalate has an intrinsic viscosity of at least about 0.95 .

23. The composition of claim 2 wherein the polyurethane has a Shore hardness of between about 70 on the A scale and 60 on the D scale.

* * * * *